United States Patent

Sato

Patent Number: 5,403,889
Date of Patent: Apr. 4, 1995

[54] POLYBUTYLENE COMPATIBILIZERS FOR BLENDS OF LOW DENSITY POLYETHYLENE AND STYRENIC POLYMERS

[75] Inventor: Kyosaku Sato, Calgary, Canada

[73] Assignee: Novacor Chemicals Ltd., Calgary, Canada

[21] Appl. No.: 153,642

[22] Filed: Nov. 17, 1993

[30] Foreign Application Priority Data

Nov. 26, 1992 [CA] Canada ................. 2083908

[51] Int. Cl.⁶ ............... C08L 23/08; C08L 25/04; C08L 51/04; C08L 23/18
[52] U.S. Cl. ...................... 525/71; 525/70; 525/86; 525/240; 525/241
[58] Field of Search .......... 525/71, 240, 70, 86, 525/241

[56] References Cited

U.S. PATENT DOCUMENTS

| | | | |
|---|---|---|---|
| 4,386,186 | 5/1983 | Maresca et al. | 525/68 |
| 4,386,187 | 5/1985 | Grancio et al. | 525/96 |
| 4,921,911 | 5/1990 | Shirodkar | 525/86 |
| 4,957,972 | 9/1990 | Shirodkar | 525/240 |
| 5,041,501 | 8/1991 | Shirodkar | 525/240 |
| 5,258,463 | 11/1993 | Evans et al. | 525/240 |

FOREIGN PATENT DOCUMENTS 1104741 7/1981 Canada .
2356694 1/1978 France .

Primary Examiner—James J. Seidleck
Assistant Examiner—M. L. Warzel
Attorney, Agent, or Firm—Bruce E. Harang

[57] ABSTRACT

Polyethylene has a number of desirable properties. However for some thin film applications it is desirable to increase the stiffness of the film. This may be accomplished by incorporating a polymer of a vinyl aromatic monomer into the alloy. Such two component blends have a low impact resistance. The impact resistance of the alloy may be significantly increased, without any significant loss of stiffness by further incorporating into the alloy a polymer based on butylene-1.

19 Claims, No Drawings

5,403,889

POLYBUTYLENE COMPATIBILIZERS FOR BLENDS OF LOW DENSITY POLYETHYLENE AND STYRENIC POLYMERS

FIELD OF THE INVENTION

The present invention relates to polymer alloys. More particularly the present invention relates to alloys of alpha olefins, a rigid polymer and a polymer which is believed to compatibilize the first two components. The polymer alloys of the present invention are useful to provide tough and stiff thin gauge films which are useful in bags.

BACKGROUND OF THE INVENTION

One of the trends in the packaging industry is towards down gauging or reducing the gauge of plastic film used in household film applications such as trash bags. While this reduces the waste going into landfills it results in several annoyances to the consumer.

Thinner bags have a lower strength (impact, tear, puncture, and tensile). Additionally, thinner bags may lack stiffness which permits the bag to be opened easily. Accordingly, it would be desirable to have bags with improved stiffness without a significant loss of strength (such as impact, tear, tensile, and puncture resistance).

Accordingly, there is a need for a polymer alloy suitable for use in thin gauge films having good stiffness without a loss in strength such as impact, puncture and/or tear resistance.

There have been a number of approaches to try to overcome the drawbacks noted above. Generally, the approach has been to blend a polyolefin with a stiffer rigid polymer, typically a styrenic polymer. Unfortunately most of these rigid polymers are not compatible with polyolefins. Accordingly a small amount of compatibilizer is added to the blend. Desirably the compatibilizer would be a polymer having a styrenic component and an olefin or at least an aliphatic component. Given this desiderata the first approach was to blend styrene butadiene styrene block polymers (SBS) or hydrogenated styrene butadiene styrene (also called styrene-ethylene-butene or butylene-styrene (SEBS)) copolymers into the alloy. This approach is illustrated by a number of patents including U.S. Pat. Nos. 4,386,186 and 4,386,187 issued May 31, 1983 assigned to Sweetheart Plastic Inc.; Canadian Patent 1,104,741 issued Jul. 7, 1981 assigned to The General Electric Company; and French Patent No. 2,356,649 published Jan. 27, 1978 in the name of Siamp-Cedap Reunies.

Applicant has conducted a number of patent searches and has been unable to locate any art relating to alloys of the present invention and particularly alloys containing a $C_{4-8}$ polyolefin in conjunction with a polyolefin and a rigid polymer.

SUMMARY OF THE INVENTION

Accordingly, the present invention provides a polymer alloy comprising:
(i) from 99 to 85 weight % of a low density olefin polymer comprising:
 (a) from 96 to 93 weight % of ethylene; and
 (b) from 7 to 4 weight % of a copolymerizable $C_{4-8}$ olefin;
(ii) from 0.5 to 10 weight % of one or more polymers selected from the group consisting of:
 (a) homopolymers comprising one or more $C_{8-12}$ vinyl aromatic monomers which are unsubstituted or substituted by a $C_{1-4}$ alkyl radical; and
 (b) graft copolymers comprising:
  (i) from 5 to 15 weight % of a rubbery substrate comprising:
   (aa) from 100 to 40 weight % of one or more $C_{4-6}$ conjugated diolefins; and
   (bb) from 0 to 60 weight % of one or more $C_{8-12}$ vinyl aromatic monomers which are unsubstituted or substituted by a $C_{1-4}$ alkyl radical;
  to which is grafted:
  (ii) from 85 to 95 weight % of a polymer comprising one or more $C_{8-12}$ vinyl aromatic monomers which are unsubstituted or substituted by a $C_{1-4}$ alkyl radical; and
(iii) from 0.3 to 5 weight % of one or more polymers selected from the group consisting of:
 (a) homopolymers of one or more $C_4$ alpha olefins; and
 (b) copolymers comprising:
  (i) from 0.5 to 6 weight % of ethylene; and
  (ii) the balance a $C_4$ alpha olefin.

DETAILED DESCRIPTION

The polymers of the present invention comprise from 99 to 85, preferably from 98.5 to 89, most preferably from 97.5 to 94 weight % of a polymer comprising from 93 to 96 weight % of ethylene and from 7 to 4 weight % of a $C_{4-8}$ copolymerizable olefin monomer such as 1-butene, hexene and octene. Preferably, the polymer will be linear low density polyethylene with a density of less than 0.940 g/cm$^3$, preferably less than 0.930 g/cm$^3$.

Suitable polyethylenes may be made by well known processes such as gas phase polymerization in the presence of a supported catalyst comprising a transition metal complex, such as a titanium halide and an activator or cocatalyst such as an alkyl aluminum halide.

The second component in the alloys of the present invention is a polymer containing a vinyl aromatic monomer. The second component is present in an amount from 0.5 to 10, preferably from 1 to 8, most preferably 2 to 5 weight %.

The polymer containing a vinyl aromatic monomer may be a homopolymer or an impact modified polymer.

The vinyl aromatic containing polymer may be a homopolymer of one or more $C_{8-12}$ vinyl aromatic monomers which are unsubstituted or substituted by a $C_{1-4}$ alkyl radical. Suitable monomers include styrene, alpha methyl-styrene and p-methyl styrene. A particularly useful monomer is styrene and the resulting polymer may be either crystal polystyrene or high impact polystyrene (HIPS).

As noted above the polymer may be an impact modified polymer. Impact modified polystyrene is also known as high impact polystyrene (HIPS). The impact polymer may be a graft polymer comprising from 5 to 15, preferably from 5 to 10 weight % of a rubbery substrate of a polymer comprising:
(i) from 100 to 40 weight % of one or more $C_{4-6}$ conjugated diolefins; and
(ii) from 0 to 60 weight % of one or more $C_{8-12}$ vinyl aromatic monomers.

Suitable conjugated diolefin monomers include butadiene and isoprene.

The rubbery substrate may be a homopolymer of isoprene or polybutadiene. The rubber may also be a styrene butadiene rubber (SBR). Typically the SBR rubbers comprise up to about 60, preferably from 40 to 60 weight % of one or more vinyl aromatic monomers, preferably styrene (hence the name).

If the rubbery polymer or substrate is a polydiolefin it may have a steric configuration. The polymer may be a high cis polymer. The high cis rubbers typically have more than 95, preferably more than 98 weight % of the monomer units in the cis configuration. Suitable high cis polymers include the TAKTENE® 1202 rubbers sold by Polysar Rubber Corporation. The polymer may be a medium cis rubber containing from about 50 to 60, preferably about 55 weight % of the monomers in the cis configuration. Suitable cis polybutadienes include DIENE 55® rubber sold by Firestone and TAKTENE® 550 rubber sold by Polysar Rubber Corporation.

Typically in the manufacture of a graft polymer the rubbery substrate is dissolved in one or more of the monomers. The monomers are then polymerized under agitation until the degree of polymerization is approximately the amount of rubber. At about this point in the polymerization and under shear the reaction mass undergoes phase inversion so that the rubber phase becomes a discontinuous rubber phase. The polymerization is then continued in one or more separate vessels and the reaction mass is devolatilized, extruded as strands which are cooled and chopped into pellets.

The polymer used as the second component in the compositions of the present invention may be totally virgin material or it may be recycle material or it may be a blend of both virgin and recycle. If a blend of virgin and recycle material is used it may comprise a weight ratio of virgin to recycle material from 25:75 to 75:25.

The third component in the alloy of the present invention is present in an amount from 0.3 to 5, preferably 0.5 to 3, most preferably 0.5 to 1 weight %. The third polymer may be a polymer selected from the group consisting of:

(a) homopolymers of one or more $C_4$ alpha olefins; and
(b) copolymers comprising:
  (i) from 0.5 to 6 weight % of ethylene; and
  (ii) the balance a $C_4$ alpha olefin.

Such homopolymers may be prepared using conventional Ziegler-Natta catalysts. Typically the polybutylene will have a (weight average) molecular weight from about 230,000 to about 750,000.

The polymer alloys of the present invention may be prepared by several methods. Generally, solvent blending will not be practical for gas phase produced polyethylene but it may be suitable for solution produced polyethylene as there are a limited number of common or miscible solvents for the different polymeric components used in the alloy.

Typically, the polymer alloy will be prepared by melt blending. There are several methods which could be used to produce the polymer alloys of the present invention. All the polymeric components are dry blended in the required weight ratio in a suitable device such as a tumble blender. The resulting dry blend is then melted in suitable equipment such as an extruder. The non polyethylene components could be formed into a master batch which is then fed to an extruder and melt blended. In a third method the dry components of the blend may be metered directly into an extruder.

The extruder may be a twin or single screw extruder. If it is a twin screw extruder it may be operated in a co-rotating mode (i.e. both screws turning in the same direction) or in a counter rotating mode (i.e. the screws rotate in opposite directions).

The specific conditions for operation of any extruder will differ from that of any other extruder. The variations between machines may usually be resolved by non-inventive testing. Typically, laboratory twin screw extruders will operate within the following envelope of conditions. The barrel will be heated to a temperature from about 180 to 210, preferably from 190° to 200° C. The screw speed will be from 120 to 150, preferably from 120 to 130 RPM's. The back pressure on the extruder will be from about 1000 to 1300, preferably from 1100 to 1250 psi. As noted above the specific conditions for the operation of any specific extruder can readily be determined by one skilled in the art by non-inventive testing in view of the above envelop of conditions.

The extruder will typically extrude the polymer alloy as strands which are then cooled and cut into pellets for subsequent use, typically film extrusion. From a practical point of view it is best to try to use polymers having similar or comparable melt index under the conditions of melt blending to obtain a uniform blend.

The film extruder may also be a single or twin screw extruder. The die may be a slot die or it may be an annular ring die extruding a film of the polymer alloy about a stable bubble of air. The film is collapsed after passing over or about the bubble. For laboratory scale film extrusion the extruder may be operated within the envelop of parameters as set forth in the examples.

The present invention has been discussed in terms of a polymer alloy. It should be kept in mind that the alloy may contain typical amounts of antioxidants, heat and light stabilizers, fillers, opacifying agents and colorants. Generally, the total of the antioxidants, and heat and light stabilizers is less than about 1, preferably less than 0.5, most preferably from 0.01 to 0.1 weight %. The opacifying agents, fillers and colorants if used may be present in significantly larger amounts.

The present invention will now be illustrated by the following non-limiting examples in which, unless otherwise specified, parts means parts by weight (i.e. grains) and % means weight %.

Sample Preparation

A series of blends were prepared. In the blends the base polyethylene polymer was linear low density polyethylene (LLDPE) having a density of 0.9 18 g/cm$^3$.

The stiffening polymer was high impact polystyrene sold under the trade name NOVACOR 525. The HIPS contained about 6.5 % of polybutadiene as an impact modifier. NOVACOR 101, a crystal polystyrene was also used as the stiffening polymer in some of the experiments.

Two different compatibilizers were evaluated.

The first compatibilizer was DURAFLEX 8640, a copolymer of butene-1 and 0.75 weight % of ethylene.

The second compatibilizer was DURAFLEX 1520, a homopolymer of butene-1.

The blends were made with a soft (density 0.918 g/cm$^3$) linear low density polyethylene. For comparison purposes it is shown as "E" in the tables. For a further comparison, the properties of a stiff or hard (density 0.923 g/cm$^3$) linear low density polyethylene are set out as "F" in the tables.

The components were dry blended in the ratio set out below.

| Sample Code | A | B | C | D | E | F |
|---|---|---|---|---|---|---|
| LLDPE | 90 | 97 | 87.3 | 96 | 100 | 100 |
| HIPS | 10 | 0 | 9.7 | 0 | 0 | 0 |
| POLYSTYRENE | 0 | 3 | 0 | 3 | 0 | 0 |
| DURAFLEX 8640 | 0 | 0 | 3.0 | 0 | 0 | 0 |
| DURAFLEX 1520 | 0 | 0 | 0 | 1 | 0 | 0 |
| ANTIOXIDANT | 0.1 | 0.1 | 0.1 | 0.1 | 0.1 | 0.1 |

The samples were tumble blended and passed through a LEISTRITZ ® twin screw extruder having 8 heated zones in the barrel heated at temperatures from 180° to 200° C., at screw speeds of 130 RPM's and at initial melt pressures of about 1200 psi.

The polymer alloy was extruded as strands which were cooled and chopped into pellets.

EXAMPLE 1

The above pellets were then fed to a blown film extruder. The extruder had a 3 inch die diameter with a die gap of 100 mils. The final film thickness was 1 mil. The barrel temperatures in the extruder ranged from 180° to 215° C. The melt pressure ranged from 1750 to 1820 PSI and the screw speed ranged from 90.7 to 98. The temperature of the melt as it exited the die was about 210° C.

The extruded blown film was measured for its physical properties. The results are set forth in Table 2.

TABLE 2

| Property/Sample | A | B | C | D | E | F |
|---|---|---|---|---|---|---|
| 1% Secant Modulus (MPa) in MD | 347 | 225 | 314 | 223 | 185 | 259 |
| Dart Impact Strength (g/mil) | 200 | 192 | 256 | 237 | 126 | 102 |
| Elmendorf Tear (g/mil) in MD | 194 | 263 | 186 | 233 | 232 | 104 |

*MD is Machine Direction

Table 2 shows a number of trends.

Comparing column E to Column F shows that a soft polyethylene has a relatively good impact and tear strength and a relatively poor stiffness while stiff polyethylene has relatively good stiffness but relatively poor impact and tear properties. Comparing column E to columns A through D shows that significant improvement in the stiffness and impact properties of soft polyethylene can be obtained by adding a small amount of a styrenic polymer. Comparing columns F and A through D shows that the stiffness of soft polyethylene can be brought up to that of stiff polyethylene without any loss, and in some cases an improvement in the impact strength and tear strength.

Comparing columns A and C, and B and D demonstrates that the compatibilizer significantly improves the dart impact strength without significantly reducing other properties of the blend.

What is claimed is:

1. A polymer alloy comprising:
   (I) 97.5 weight % of a low density olefin polymer comprising:
     (a) from 96 to 93 weight % of ethylene; and
     (b) from 7 to 4 weight % of a copolymerizable $C_{4-8}$ olefin;
   (II) 2 weight % of one or more polymers selected from the group consisting of:
     (a) hompolymers comprising one or more $C_{8-12}$ vinyl aromatic monomers which are unsubstituted or substituted by a $C_{1-4}$ alkyl radical; and
     (b) graft copolymers comprising:
       (i) from 5 to 15 weight % of a rubbery substrate comprising:
         (aa) from 100 to 40 weight % of one or more $C_{4-6}$ conjugated diolefins; and
         (bb) from 0 to 60 weight % of one or more $C_{8-12}$ vinyl aromatic monomers which are unsubstituted or substituted by a $C_{1-4}$ alkyl radical;
       to which is grafted:
       (ii) from 85 to 95 weight % of a polymer comprising one or more $C_{8-12}$ vinyl aromatic monomers which are unsubstituted or substituted by a $C_{1-4}$ alkyl radical; and
   (III) 0.5 weight % of one or more polymers selected from the group consisting of:
     (a) homopolymers of one or more $C_4$ alpha olefins; and
     (b) copolymers comprising:
       (i) from 0.5 to 6 weight % of ethylene; and
       (ii) the balance a $C_4$ olefin.

2. The polymer alloy according to claim 1, wherein component (I) has a density less than 0.940 g/cm³.

3. The polymer alloy according to claim 2, wherein in component (II) said $C_{8-12}$ vinyl aromatic monomer is selected from the group consisting of styrene, alpha methyl styrene, and p-methyl styrene and said $C_{4-6}$ conjugated diolefin is selected from the group consisting of butadiene and isoprene.

4. The polymer alloy according to claim 3, wherein component (II) is selected from the group consisting of polystyrene and high impact polystyrene.

5. The polymer alloy according to claim 4, wherein component (III) is homopolybutylene-1.

6. The polymer alloy according to claim 4, wherein component (II) is high impact polystyrene comprising from 5 to 15 weight % of polybutadiene to which is grafted from 95 to 85 weight % of polystyrene.

7. The polymer alloy according to claim 4, wherein component (II) is polystyrene.

8. The polymer alloy according to claim 4, wherein component (III) comprises: (i) from 0.5 to 6 weight % of ethylene; and (ii) the balance butylene-1.

9. The polymer alloy according to claim 8, wherein component (II) is high impact polystyrene comprising from 5 to 15 weight % of polybutadiene to which is grafted from 95 to 85 weight % of polystyrene.

10. The polymer alloy according to claim 8, wherein component (II) is polystyrene.

11. The polymer alloy according to claim 2, wherein component (I) has a density of less than 0.930 g/cm³.

12. The polymer alloy according to claim 11, wherein in component (II) said $C_{8-12}$ vinyl aromatic monomer is selected from the group consisting of styrene, alpha methyl styrene, and p-methyl styrene and said $C_{4-6}$ conjugated diolefin is selected from the group consisting of butadiene and isoprene.

13. The polymer alloy according to claim 12, wherein component (II) is selected from the group consisting of polystyrene and high impact polystyrene.

14. The polymer alloy according to claim 12, wherein component (III) is homopolybutylene-1.

15. The polymer alloy according to claim 12, wherein component (II) is high impact polystyrene comprising from 5 to 15 weight % of polybutadiene to which is grafted from 95 to 85 weight % of polystyrene.

16. The polymer alloy according to claim 12, wherein component, (II) is polystyrene.

17. The polymer alloy according to claim 12, wherein component (III) comprises:
   (i) from 0.5 to 6 weight % of ethylene; and
   (ii) the balance butylene-1.

18. The polymer alloy according to claim 16, wherein component (II) is high impact polystyrene comprising from 5 to 15 weight % of polybutadiene to which is grafted from 95 to 85 weight % of polystyrene.

19. The polymer alloy according to claim 17, wherein component (II) is polystyrene.

* * * * *